US009370713B2

(12) United States Patent
Okura

(10) Patent No.: US 9,370,713 B2
(45) Date of Patent: Jun. 21, 2016

(54) GAME DEVICE, GAME CONTROL METHOD, AND GAME CONTROL PROGRAM FOR CONTROLLING GAME IN WHICH CHARACTER IS MOVED IN THREE DIMENSIONAL SPACE

(75) Inventor: Junya Okura, Saitama (JP)

(73) Assignees: Sony Corporation, Tokyo (JP); Sony Interactive Entertainment Inc., Tokyo (JP)

( * ) Notice: Subject to any disclaimer, the term of this patent is extended or adjusted under 35 U.S.C. 154(b) by 715 days.

(21) Appl. No.: 13/342,422

(22) Filed: Jan. 3, 2012

(65) Prior Publication Data

US 2012/0184375 A1 Jul. 19, 2012

(30) Foreign Application Priority Data

Jan. 17, 2011 (JP) ................................. 2011-006951
Jun. 3, 2011 (JP) ................................. 2011-125494
Jun. 3, 2011 (JP) ................................. 2011-125495

(51) Int. Cl.
*A63F 13/40* (2014.01)

(52) U.S. Cl.
CPC .......... *A63F 13/10* (2013.01); *A63F 2300/1075* (2013.01); *A63F 2300/204* (2013.01); *A63F 2300/305* (2013.01); *A63F 2300/306* (2013.01); *A63F 2300/64* (2013.01); *A63F 2300/6676* (2013.01)

(58) Field of Classification Search
USPC ................................ 463/2, 14, 40, 42, 43, 32
See application file for complete search history.

(56) References Cited

U.S. PATENT DOCUMENTS

| 7,690,988 | B2 * | 4/2010 | Kaido et al. ..................... 463/23 |
| 7,918,729 | B2 * | 4/2011 | Shinoda et al. ................. 463/31 |
| 7,927,217 | B2 * | 4/2011 | Kimura ........................... 463/42 |
| 8,342,963 | B2 * | 1/2013 | Steiner et al. ................... 463/36 |
| 2007/0270215 | A1 | 11/2007 | Miyamoto |
| 2009/0005139 | A1 | 1/2009 | Morimoto |
| 2009/0017907 | A1 | 1/2009 | Shimizu |

(Continued)

FOREIGN PATENT DOCUMENTS

| EP | 1570886 A1 | 9/2005 |
| JP | 2005319136 A | 11/2005 |

(Continued)

OTHER PUBLICATIONS

European Search Report for corresponding EP Application No. 12000209.2-1905/2478942, dated Dec. 4, 2013.

(Continued)

*Primary Examiner* — Pierre E Elisca
(74) *Attorney, Agent, or Firm* — Matthew B. Dernier, Esq.

(57) ABSTRACT

A game device includes: a screen generation unit configured to read data for a character and an object located in a three-dimensional game field from a storage device, generate images of the character and the object, and display the images on a displace device; a character control unit configured to control the movement of the character landing on the object; a gravitational direction control unit configured to change the direction of gravitational force exerted on the character in accordance with a command input from a player acknowledged by an input device; and a fall control unit configured to cause the character to fall in the changed direction of the gravitational force. The gravitational direction control unit displays a marker indicating a position where the character would land after falling.

17 Claims, 20 Drawing Sheets

(56) References Cited

U.S. PATENT DOCUMENTS

2009/0023485 A1* 1/2009 Ishihata .................. A63F 13/10
                                                        463/2
2010/0273544 A1* 10/2010 Koganezawa et al. ............ 463/2

FOREIGN PATENT DOCUMENTS

| | | | |
|---|---|---|---|
| JP | 2007330675 | A | 12/2007 |
| JP | 2008041013 | A | 2/2008 |
| JP | 2009011371 | A | 1/2009 |
| JP | 2009011567 | A | 1/2009 |
| JP | 2009015793 | A | 1/2009 |

OTHER PUBLICATIONS

Office Action for corresponding JP Application No. 2011-125494, dated Mar. 31, 2015.
Office Action for corresponding JP Application No. 2011-125495, dated Mar. 31, 2015.
Office Action for corresponding JP Application No. 2011-125494, dated May 26, 2015.
Sonic Riders SSS—Megalo Station (Story), [online], upload date Sep. 25, 2010, [searched on May 18, 2015], <URL, https://www.youtube.com/watch?v=qapYMcpk1eQ> (for relevancy see Office Action for JP Application 2011125494 dated May 26, 2015 cited above).

* cited by examiner

GAME DEVICE, GAME CONTROL METHOD, AND GAME CONTROL PROGRAM FOR CONTROLLING GAME IN WHICH CHARACTER IS MOVED IN THREE DIMENSIONAL SPACE

BACKGROUND OF THE INVENTION

1. Field of the Invention

The present invention relates to a game control technology and, more particularly, to a game device, a game control method, and a game control program for controlling a game in which a character is moved in a three-dimensional space.

2. Description of the Related Art

A large number of games are provided in which the player manipulates a character to move in a game field and achieve a certain mission by beating an enemy character or acquiring an item. New game values are pursued through attempts to devise a system that governs a battle with an enemy character or through introduction of novel events.

However, attempts to devise a special means to move a character in a game field, other than causing a character to walk or ride in a vehicle, are rare regardless of whether the game field is two dimensional or three dimensional.

SUMMARY OF THE INVENTION

The present invention addresses the above-mentioned situation and a purpose thereof is to provide a game control technology capable of providing higher entertainment values.

One embodiment of the present invention relates to a game control program. The game control program comprises a module configured to read data for a character and an object located in a three-dimensional game field from a storage device, generate images of the character and the object, and display the images on a display device; a module configured to control the movement of the character landing on an object; a module configured to change the direction of gravitational force exerted on the character in accordance with a command input from a player acknowledged by an input device; a module configured to cause the character to fall in the changed direction of the gravitational force; and a module configured to display a marker indicating a position where the character would land after falling.

Another embodiment of the present invention relates to a game control program. The game control program comprises: a module configured to generate images of a character and a plurality of objects located in a three-dimensional game field and display the images; a module configured to control the movement of the character landing on an object; a module configured to change the direction of gravitational force exerted on the character in accordance with a command input from a player; a module configured to cause the character to fall in the changed direction of the gravitational force; and a module configured to cause an object within a predetermined range from the character to fall in the changed direction of the gravitational force along with the character.

Optional combinations of the aforementioned constituting elements, and implementations of the invention in the form of methods, apparatuses, systems, computer programs, data structures, and recording mediums may also be practiced as additional modes of the present invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE INVENTION

The invention will now be described by reference to the preferred embodiments. This does not intend to limit the scope of the present invention, but to exemplify the invention.

The game device according to the embodiment provides a game in which a character is moved in a three-dimensional space where objects, etc. are located. The character can move over objects like stars, rocks, and bases located in a three-dimensional game field by, for example, walking among the objects. The game device according to the embodiment also provides a function whereby a character is moved to another object in a game field by changing the direction of gravitational force exerted on the character in the game field, causing the character to fall in the changed gravitational direction and to land on the other object located in the direction of fall. Thus, the embodiment provides the player with novel entertainment values, by providing a function to move in a three-dimensional space using a completely novel method that cannot possibly be realized in a real world.

Figure 1:
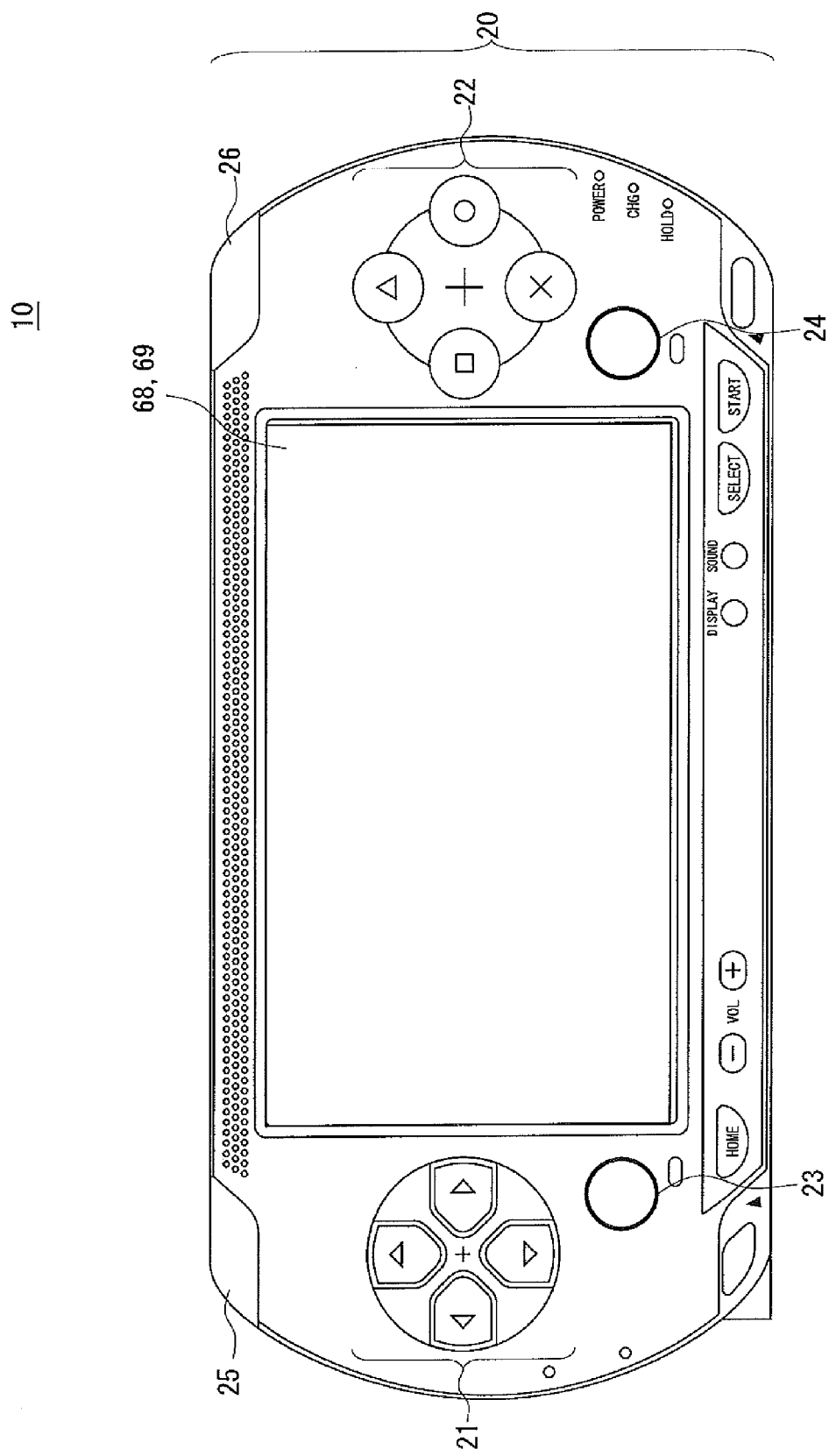
FIG. 1 shows the appearance of a game device according to the embodiment.
Figure 2:
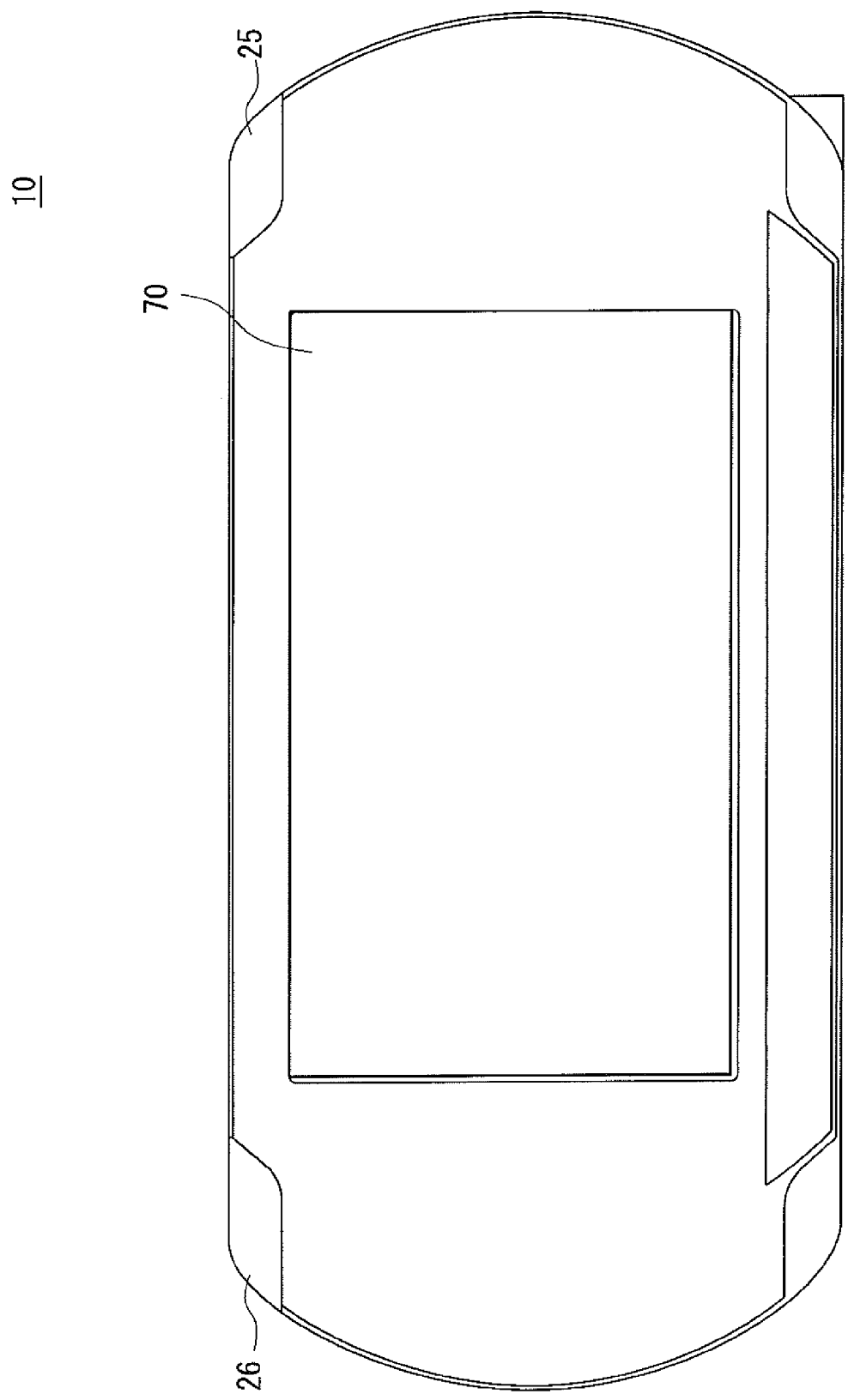
FIG. 2 shows the appearance of a game device according to the embodiment.

FIGS. 1 and 2 show the appearance of a game device 10 according to the embodiment. The game device 10 shown in FIGS. 1 and 2 is a mobile game device designed to be held by the player for use. As shown in FIG. 1, the front face of the game device 10, i.e., the side facing the player as the player holds and controls the game device 10, is provided with an input device 20 comprising command directional keys 21, buttons 22, a left analog stick 23, a right analog stick 24, a left button 25, and a right button 26 and is also provided with a display device 68. A touch panel 69 for sensing contact by the user's finger or a stylus pen is installed at the display device 68.

As shown in FIG. 2, a rear touch panel 70 is provided on the back of the game device 10. A display device may be provided on the back of the game device 10 similarly to the front face. In this embodiment, a display device is not provided on the back of the game device 10 and only a rear touch panel 70 is provided.

The player holding the game device 10 with both hands can control the button 22 with the right thumb, control the directional keys 21 with the left thumb, control the right button 26 with the right index finger or middle finger, control the left button 25 with the left index finger or middle finger, control the touch panel 69 with both thumbs, and control the rear touch panel 70 with both ring fingers or little fingers. When using a stylus pen, the user may hold the game device 10 with the left hand. A stylus pen held by the right hand or the index finger may be used to control the touch panel 69 and the buttons 22. The user may control the directional keys 21 with the left thumb, control the left button 25 with the left index finger or middle finger, and control the rear touch panel 70 with the left ring finger or little finger.

Figure 3:
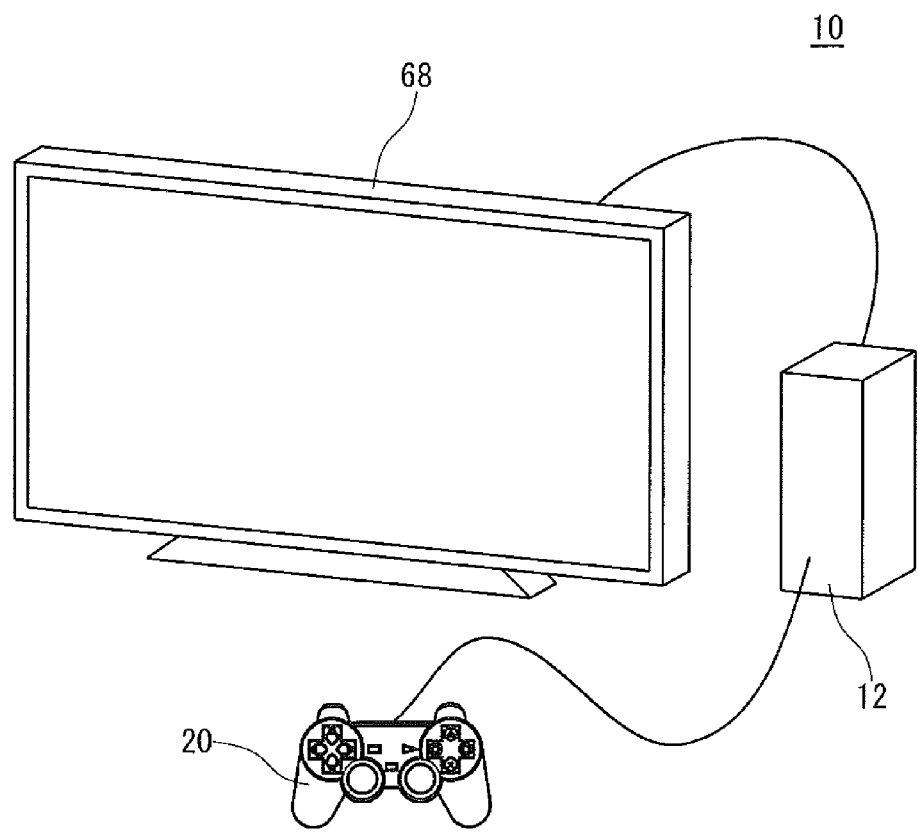
FIG. 3 shows another exemplary configuration of the game device according to the embodiment.

FIG. 3 shows another exemplary configuration of the game device 10 according to the embodiment. The game device 10 shown in FIG. 3 is a desktop game device. The game device 10 comprises a main unit 12 provided with hardware such as a CPU and a memory, an input device 20 adapted to acknowledge an input from the player, and a display device 68. The input device 20 communicates with the main unit 12 by cable or wirelessly and transmits an input command acknowledged from the player to the main unit 12.

Figure 4:
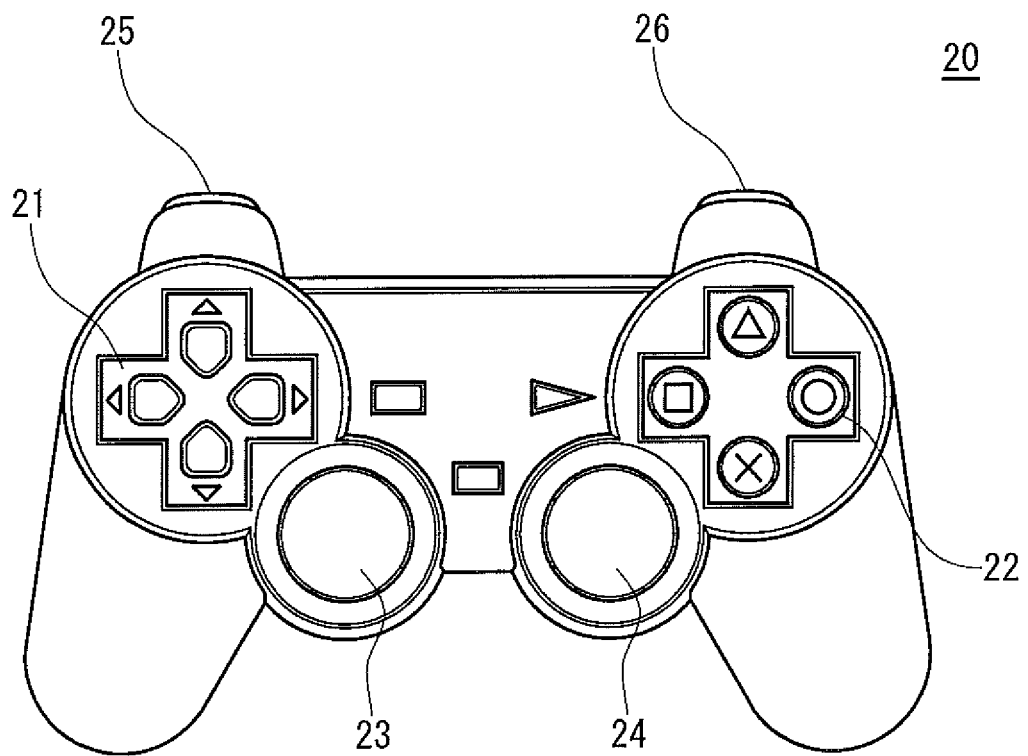
FIG. 4 shows the appearance of the game device shown in FIG. 3.

FIG. 4 shows the appearance of the input device of the game device shown in FIG. 3. The input device 20 is provided with directional keys 21, buttons 22, a left analog stick 23, a right analog stick 24, a left button 25, and a right button 26.

Figure 5:
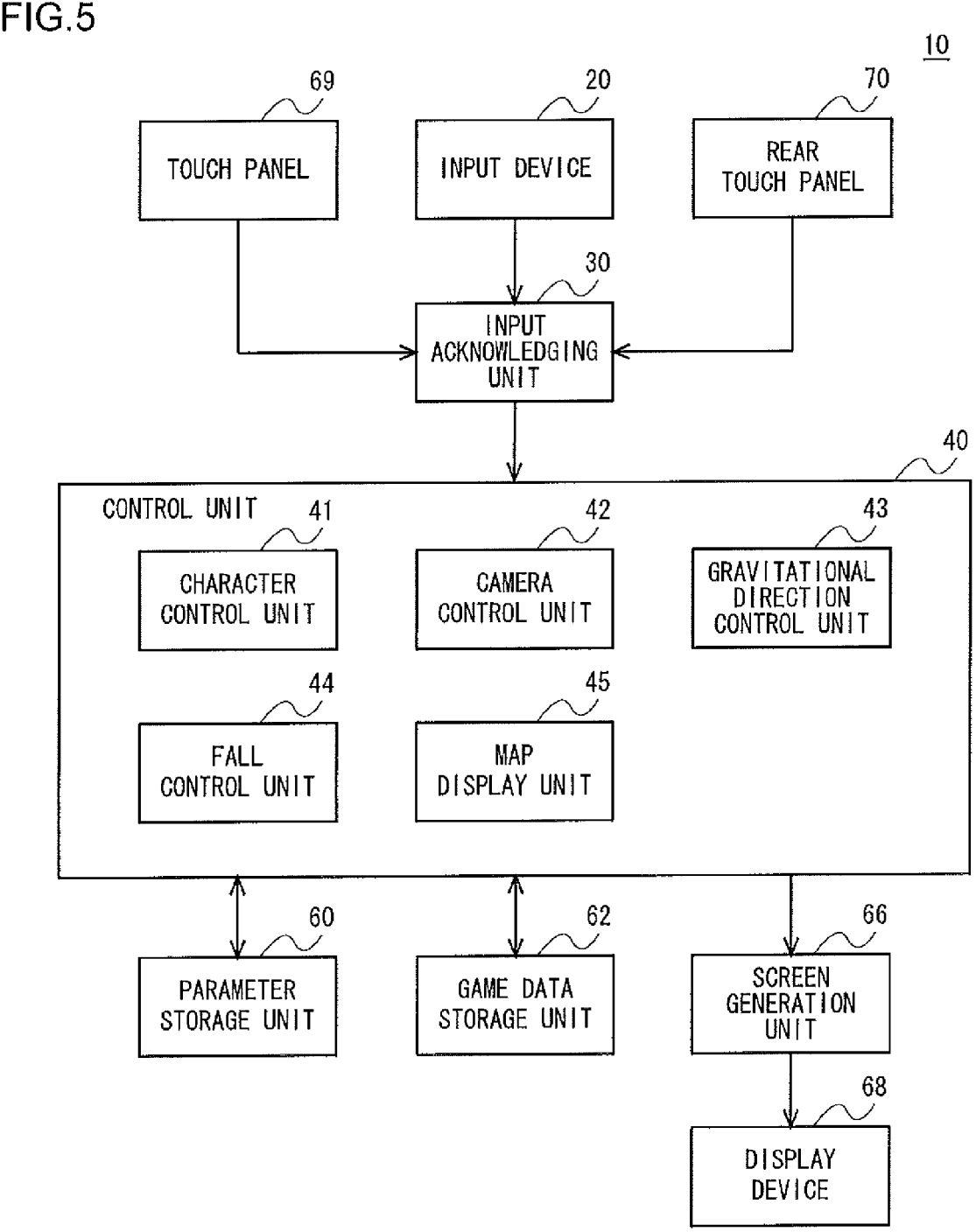
FIG. 5 shows the configuration of the game device according to the embodiment.

FIG. 5 shows the configuration of the game device 10 according to the embodiment. The game device 10 comprises an input device 20, a touch panel 69, a rear touch panel 70, an input acknowledging unit 30, a control unit 40, a parameter storage unit 60, a game data storage unit 62, a screen generation unit 66, and a display device 68. The blocks depicted in the block diagram of this specification are implemented in hardware such as devices or mechanical components like a CPU of a computer, and in software such as a computer program etc. FIG. 5 depicts functional blocks implemented by the cooperation of these elements. Therefore, it will be obvious to those skilled in the art that the functional blocks may be implemented in a variety of manners by hardware only, software only, or a combination of thereof.

The input acknowledging unit 30 acknowledges a control signal input from the input device 20, the touch panel 69, and the rear touch panel 70 controlled by the player. The control unit 40 controls a character in accordance with a control input from the player acknowledged by the input acknowledging unit 30 and advances the game. The parameter storage unit 60 stores parameters necessary for the progress of the game. The game data storage unit 62 stores a game program, three-dimensional shape data of an object forming a game field, shape data and attribute data of a character. The screen generation unit 66 generates a screen of a game controlled by the control unit 40 and causes the screen to be displayed by the display device 68.

The player can use the left analog stick 23 to move the character in a desired direction and use the right analog stick 24 to move the viewing position of the camera. Further, the player can change the direction of gravitational force exerted on the character, using the right button 26.

The control unit 40 comprises a character control unit 41, a camera control unit 42, a gravitational direction control unit 43, a fall control unit 44, and a map display unit 45.

When a game is started, the control unit 40 reads the shape data of a character and an object located in the game field from the game data storage unit 62, defines the viewing position and viewing direction of the camera, and causes the screen generation unit 66 to generate a screen of the game field. The shape data of a character or an object located in the game field is stored in the game data storage unit 62. Further, the default gravitational direction is stored in the parameter storage unit 60. The viewing position and viewing direction of the camera are defined by the camera control unit 42. If the destination of movement of a character is defined, the control unit 40 may display the direction in which the destination is located on the screen, using an arrow or the like.

The character control unit 41 controls the player's character located in the game field in accordance with a control command from the player acknowledged by the input acknowledging unit 30 and provided via the input device 20. When an input from the left analog stick 23 is acknowledged while the character is landing on the ground of, for example, an object, the character control unit 41 moves the character in the designated direction. The ground on which the character is moved is represented in three-dimensional data. The character control unit 41 adds a vector of a predetermined length in the designated direction to the coordinates of the character's current position. If the ground is located above or below the resultant position, the character control unit 41 defines the position on the ground as a new position of the character. If the ground is not located, the character control unit 41 may disable the movement in that direction and may not move the character from the current position. If the tilt of the ground in the designated direction is larger than a predetermined value, the character control 41 may disable the movement of the character in that direction. If a step of a predetermined height or greater is located in the designated direction, the character control unit 41 may disable the movement of the character in that direction.

The camera control unit 42 controls the camera used to render three-dimensional data when creating a game screen. The camera control unit 42 changes the viewing position and viewing direction of the camera in accordance with a control command from the player acknowledged by the input acknowledging unit 30 and provided via the input device 20. When a command input designating a direction is acknowledged from the right analog stick 24, the camera control unit 42 moves camera in the designated direction. The camera control unit 42 moves the position of the camera along a sphere having a predetermined radius around the character's current position or a predetermined position in the neighborhood of the character. The camera control unit 42 defines the direction in which the character is viewed from the camera's current position as the camera's viewing direction. This ensures that the character is always displayed on the game screen.

While the character is moving on the ground, the camera control unit 42 defines the camera's viewing position at a position behind the character and slightly above the character and moves the viewing position so as to follow the movement of the character. While the character remains still on the ground, the character control unit 42 moves the camera's viewing position in accordance with a command input from the player. In this process, the camera control unit 42 controls the camera's viewing position so as not to enter the ground. If a command input is not provided for a predetermined period of time or longer from the player, the camera control unit 42 may return the camera's viewing position to a predetermined position.

If a command input is not provided from the player while the character is falling in the air, the camera control unit 42 defines the camera's viewing position at a predetermined position above the character and moves the viewing position so as to follow the fall of the character. In response to a command input from the player, the camera control unit 42 moves the camera's viewing position in accordance with the command input. In this process, the camera control unit 42 may change the camera's viewing position to an arbitrary position on a sphere having a predetermined radius and defined around the character. If a command input is not provided for a predetermined period of time or longer from the player, the camera control unit 42 may return the camera's viewing position to a predetermined position.

In the above example, the camera control unit 42 changes only the camera's viewing position in accordance with a command input from the player and defines the direction in which the character is viewed from the changed position as the camera's viewing direction. In a variation, the camera control unit 42 may acknowledge a command input for changing the camera's viewing position and a command input for changing the camera's viewing direction separately and may change both the viewing position and the viewing direction.

The gravitational direction control unit 43 controls the direction of gravitational force exerted on the character in accordance with a command input acknowledged by the input acknowledging unit 30 and provided via the input device 20. When an input is acknowledged from the right button 26 of the input device 20, the gravitational direction control unit 43 moves the character from the current position to a predetermined height and displays the character floating in the air. While the character is floating in the air, the character control unit 41 does not move the character even if a command input to move the character is acknowledged. When a command input for cancellation is acknowledged while the character is floating in the air, the gravitational direction control unit 43 causes the character to land on the ground. In this process, the character is returned to the original posture and the character control unit 41 resumes the control of the movement of the character.

When an input is acknowledged via a right button 26 again while the character is floating in the air, the gravitational direction control unit 43 changes the direction of gravitational force exerted on the character to a direction parallel to the current viewing direction of the camera. This causes the character previously located on the ground of an object to fall in the direction of depth of the screen away from the object. In the game device according to the embodiment, the camera's viewing direction is defined as a direction in which the character is viewed from the camera's viewing position, as mentioned before. Therefore, the player can cause the character to fall toward a destination by providing a command input to change the gravitational direction after adjusting the camera's viewing position such that the destination to which the character is desired to be moved is displayed immediately behind the character. This provides a novel method of moving a character by changing the gravitational direction, while also providing a user interface intuitively controlled by the player. The camera control unit 42 acknowledges a change in the camera's viewing position using the right analog stick 24 not only while the character is on the ground but also while the character is caused by the gravitational direction control unit 43 to float in the air. Therefore, the player can adjust the position where the character lands using the right analog stick 24 even while the character is caused to float in the air by clicking on the right button 26 once.

The gravitational direction control unit 43 displays a marker indicating the position where the character lands when an input via a predetermined one of the buttons 22 is acknowledged to cause the character to float in the air, and keeps displaying the marker until an input for cancellation is acknowledged and the change in the gravitational direction is canceled accordingly. Alternatively, the gravitational direction control unit 43 keeps displaying the marker indicating the position where the character lands until the character lands on another object after falling due to the changed gravitational force, or until the fall is canceled after the character has fallen a predetermined distance or more. The gravitational direction control unit 43 defines an object closest to the current position of the character in the direction of fall of the character, i.e., in the current viewing direction of the camera as a location of landing. The gravitational direction control unit 43 displays a marker on the surface of the object. If no objects are located within a predetermined distance from the current position of the character in the direction of fall of the character, the gravitational direction control unit 43 defines a position at a predetermined distance as a virtual position of landing and displays a marker at the defined position. This allows the player to clearly know the position where the character lands.

The gravitational direction control unit 43 changes the direction of gravitational force exerted not only on the character but also on an object located within a predetermined range around the character. The predetermined range may be stored in association with a game situation or the like so that the gravitational direction control unit 43 changes the range depending on the game situation. Alternatively, the range may be changed in accordance with a command from the player. The predetermined range may be a range in the neighborhood of the character that can be reached by the character's hand. Alternatively, the range may be the entirety of the game field or a range of an arbitrary extent. This allows an object around the character to fall along with the character. When the gravitational direction control unit 43 changes the gravitational direction, the gravitation direction control unit 43 stores the gravitational direction as changed in the parameter storage unit 60.

The gravitational direction control unit 43 manages increase and decrease of a point (token) necessary to change the gravitational direction. The gravitational direction control unit 43 defines the initial value of the point to 0 or a predetermined value at the start of the game and stores the value in the parameter storage unit 60. While the game is in progress, the gravitational control unit 43 increases the point at a predetermined speed according to the elapse of time. When the character obtains an item or the like, the gravitational direction control unit 43 increases the point by an amount that depends on the type of item. When the point reaches the maximum value, the gravitational direction control unit 43 does not increase the point any more. When a command input to change the gravitational direction is acknowledged, the gravitational direction control unit 43 refers to the parameter storage unit 60 to see whether the point of a predetermined amount necessary to change the gravitational direction remains. If so, the gravitational direction control unit 43 changes the gravitational direction and decreases the point by a predetermined amount. If the necessary point is not available, the gravitational direction control unit 43 displays as such on the screen and does not acknowledge a change in the gravitational direction.

The fall control unit 44 controls the character and the object falling in the three-dimensional space in the game field. The fall control unit 44 causes the character and the object to fall in the current gravitational direction. The fall control unit 44 may exert the gravitational force on the character and the object, causing the character and the object to fall freely as physically calculated. Alternatively, physical calculation may allow for resistance from air, etc. to cause the character and the object to fall accordingly. Still alternatively, real world physical phenomenon may not be emulated. The character and the object may fall at a predetermined speed. As described, "changing the direction of gravitational force exerted on the character and the object" in this specification means changing the direction in which the character and the object fall and does not necessarily mean actually exerting gravitational force and doing physical calculation to calculate the behavior of the character and the object.

The fall control unit 44 may control the mode in which the character and the object fall so that the player can easily know the direction of fall while the character and the object are falling. The fall control unit 44 may control the orientation of the character so that a part of the character faces the direction of fall. For example, the fall control unit 44 may control the orientation of the character so that character falls headlong or feet first. This allows the player to know that the direction in which the head or feet of the character is located as the direction of fall. The fall control unit 44 may control the orientation so that a part of the character (e.g., hair) trails in the direction opposite to the direction of fall or the character's clothing flips due to the wind pressure caused by the fall. The fall control unit 44 may allow the player to know the direction of fall by viewing the relative position of the object and the character. This can be achieved by locating an object like sand or broken glass around the character and controlling the object to fall at a speed lower than that of the character and to move away from the character in the direction opposite to the direction of fall. The fall control unit 44 may display the direction of fall of the character on the screen using graphics like an arrow or an object. With these maneuvers, the player can easily know the direction of fall of the character even if the camera's viewing position or viewing direction is changed while the character is falling.

The fall control unit 44 may control the mode in which the character and the object fall so that the player can know the gravitational direction occurring when the control unit 40 started the game, i.e., the default gravitation direction occurring before the gravitational direction is changed by the gravitational direction control unit 43. For example, the gravitational direction control unit 44 may exert the gravitational force in the default direction on a part of the character (e.g., hair of ear) so that the hair or the ear trails in the default gravitational direction. This allows the player to know the default gravitational direction and know the player's current position or the direction of the destination by comparing the default direction with the map described later, even when the gravitational direction is changed to a desired direction.

The fall control unit 44 acknowledges an input via, for example, the left analog stick 23 while the character and the object are falling and moves the character and the object back and forth and from side to side in the air. Once the gravitational direction is changed and the character and the object begin falling, the player cannot change the gravitational direction again while the character and the object are falling. The player can adjust the position of landing by moving the character and the object back and forth and from side to side in the air.

When the falling character and the object run into another object such as a star, the fall control unit 44 causes the character and the object to land on the object. In this process, the fall control unit 44 may display the character landing and then rising to the character's feet on the screen. If the surface of landing is tilted by a predetermined angle or more with respect to the gravitational direction, the fall control unit 44 may display the character sliding the slope on the screen. Alternatively, the fall control unit 44 may change the gravitational direction or rotate the object that the character landed so that the surface of landing is inclined at a predetermined angle or less. If the tilt of the surface that the character runs into with respect to the gravitational direction is equal to or more than a predetermined value, the fall control unit 44 may control the character not to land on the surface and keep falling after bounding.

While the character is being displayed rising to the character's feet after landing on the object, the fall control unit 44 moves the camera's viewing position to a predetermined position behind the character and slightly above the character and rotates the screen so that the current gravitational direction is aligned with the vertical direction of the screen. This allows the player to easily know that the character has landed on the object and can easily see the tilt of the surface of landing of the character, etc.

If the falling character reaches a predetermined position (e.g., an end of the game field) without landing on any object, the fall control unit 44 may warp the character to predetermined position elsewhere or determines that the game is over, identifying that the character is dead. In order to avoid such a situation, the player can change the camera's viewing direction while the character is falling and change the gravitational direction again accordingly, thereby causing the character to fall in an alternative direction and land on an object located in the direction of fall.

The map display unit 45 displays a map showing the entirety of the game field. The map may be an image of the game field as viewed from a fixed viewing position in a fixed viewing direction. Alternatively, the player may change the camera's viewing position or viewing direction using the camera control unit 42. The map display unit 45 ensures that the default gravitational direction is aligned with the vertical direction of the screen. If a destination that the character should move to is defined, the map display unit 45 displays the destination on the map in an identifiable manner.

Figure 6:
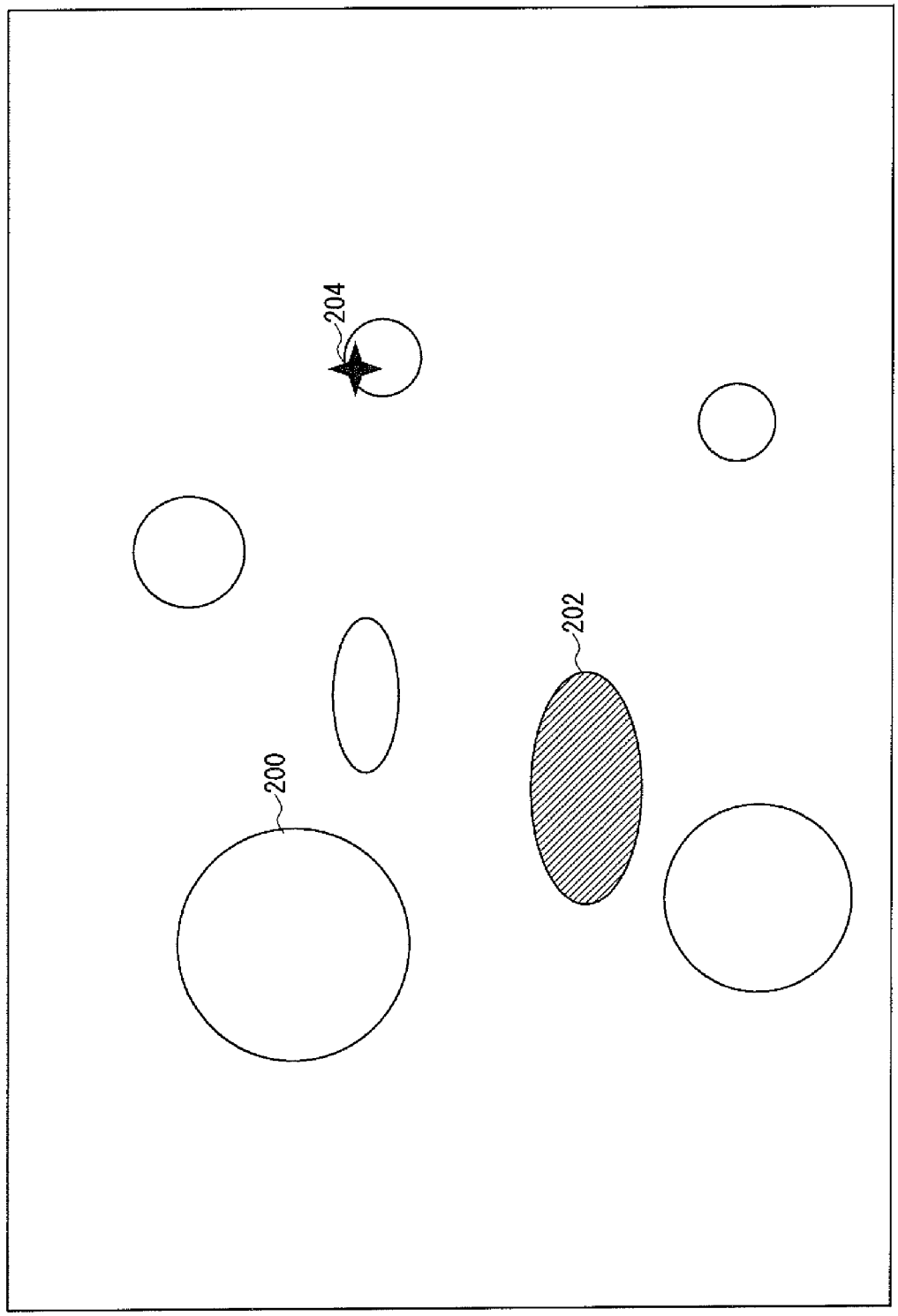
FIG. 6 shows an exemplary map screen displayed by the map display unit.

FIG. 6 shows an exemplary map screen displayed by the map display unit 45. Objects 200 such as stars are located in a three-dimensional game field. An object 202 on which the character is located is displayed so as to be visually distinguishable from the other objects. An icon 204 indicating the destination that the character should move to is displayed.

Figure 7:
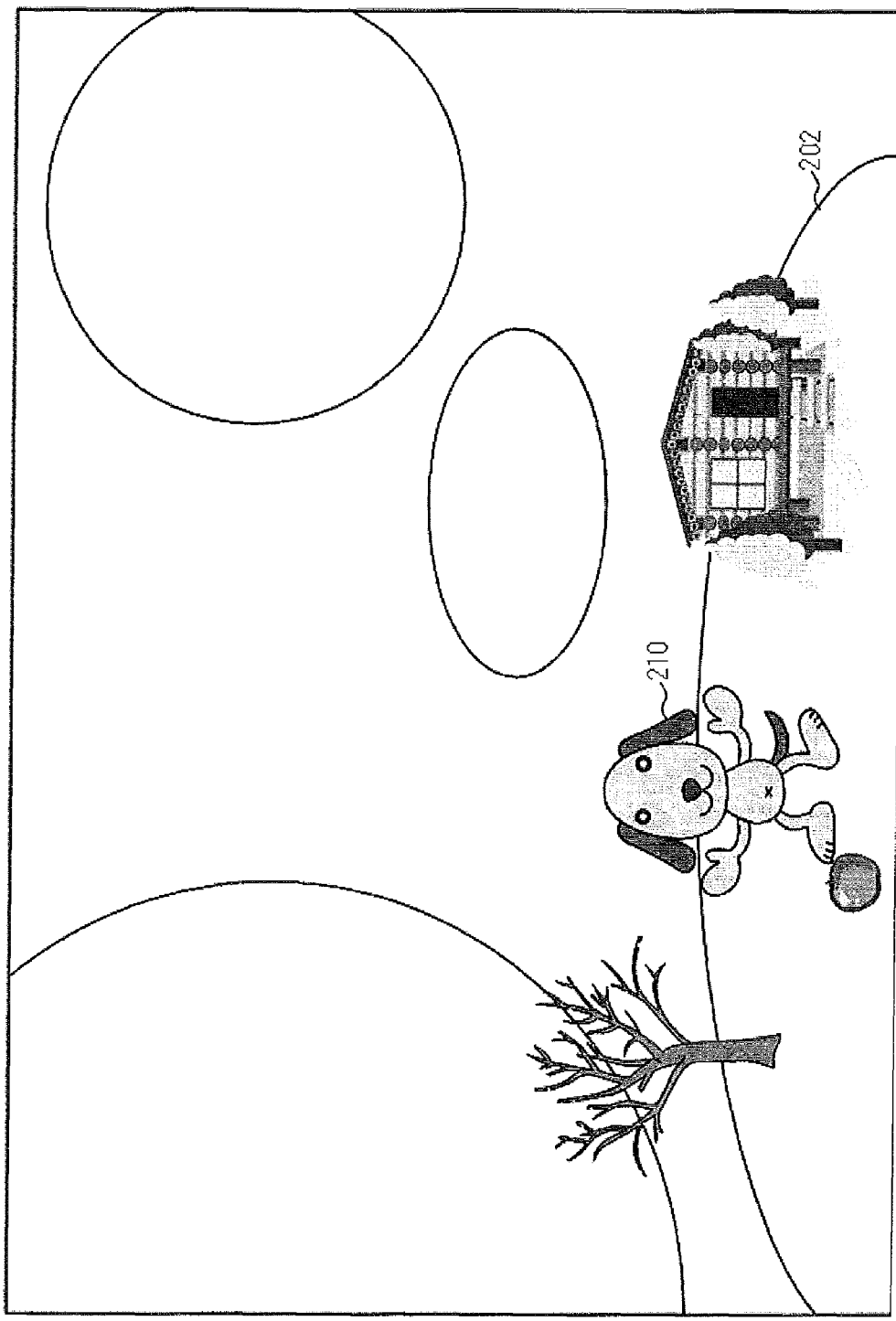
FIG. 7 shows an exemplary game screen.
Figure 8:
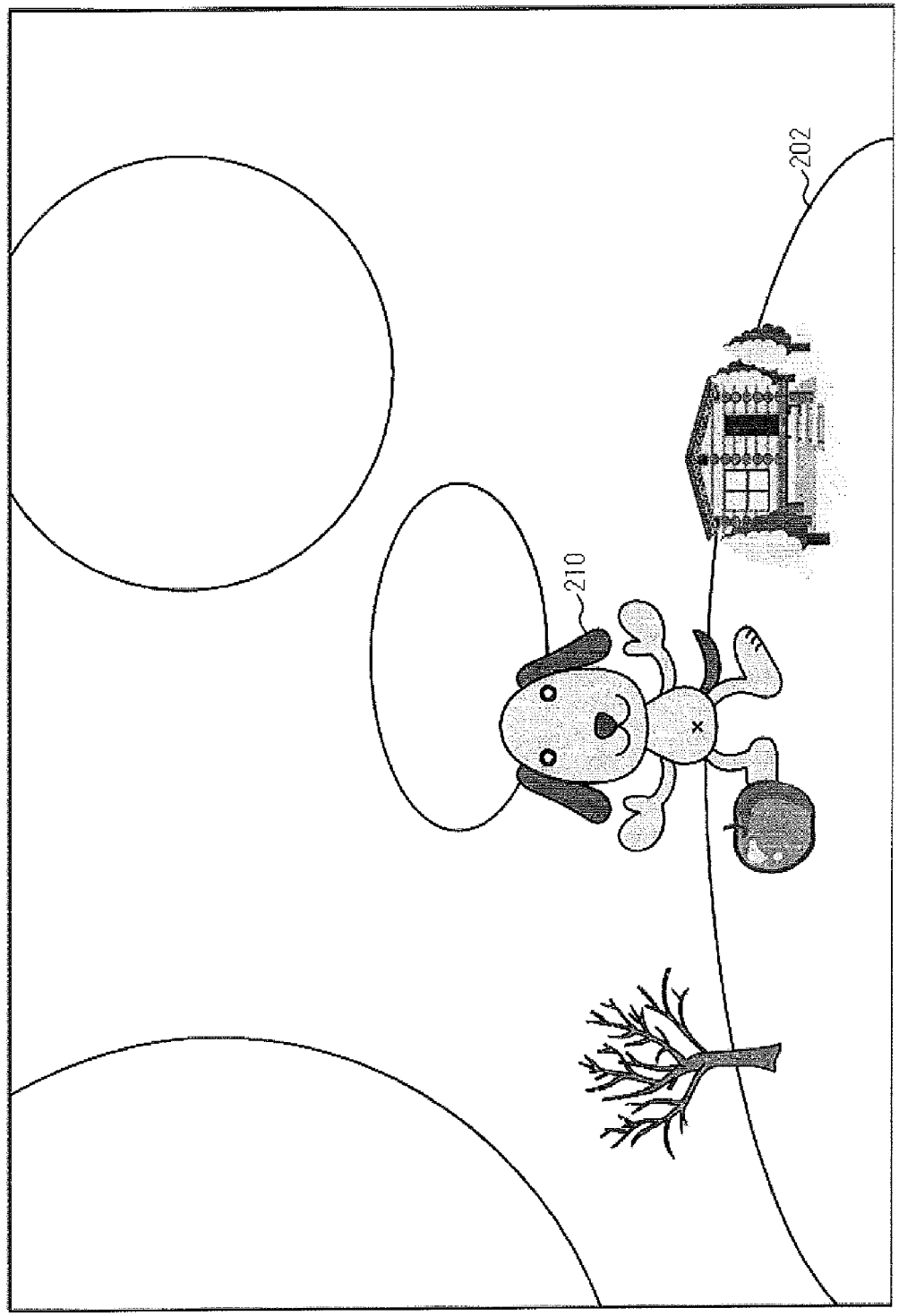
FIG. 8 shows an exemplary game screen.

FIG. 7 shows an exemplary game screen. A character 210 is located on the ground of the object 202. When the player uses the left analog stick 23 of the input device 20, the character control unit 41 moves the character 210 in a designated direction.

FIG. 7 shows an exemplary game screen. When the player uses the right analog stick 24 of the input device 20, the camera control unit 42 moves the camera's viewing position in a designated direction. This changes the camera's viewing position and viewing direction.

Figure 9:
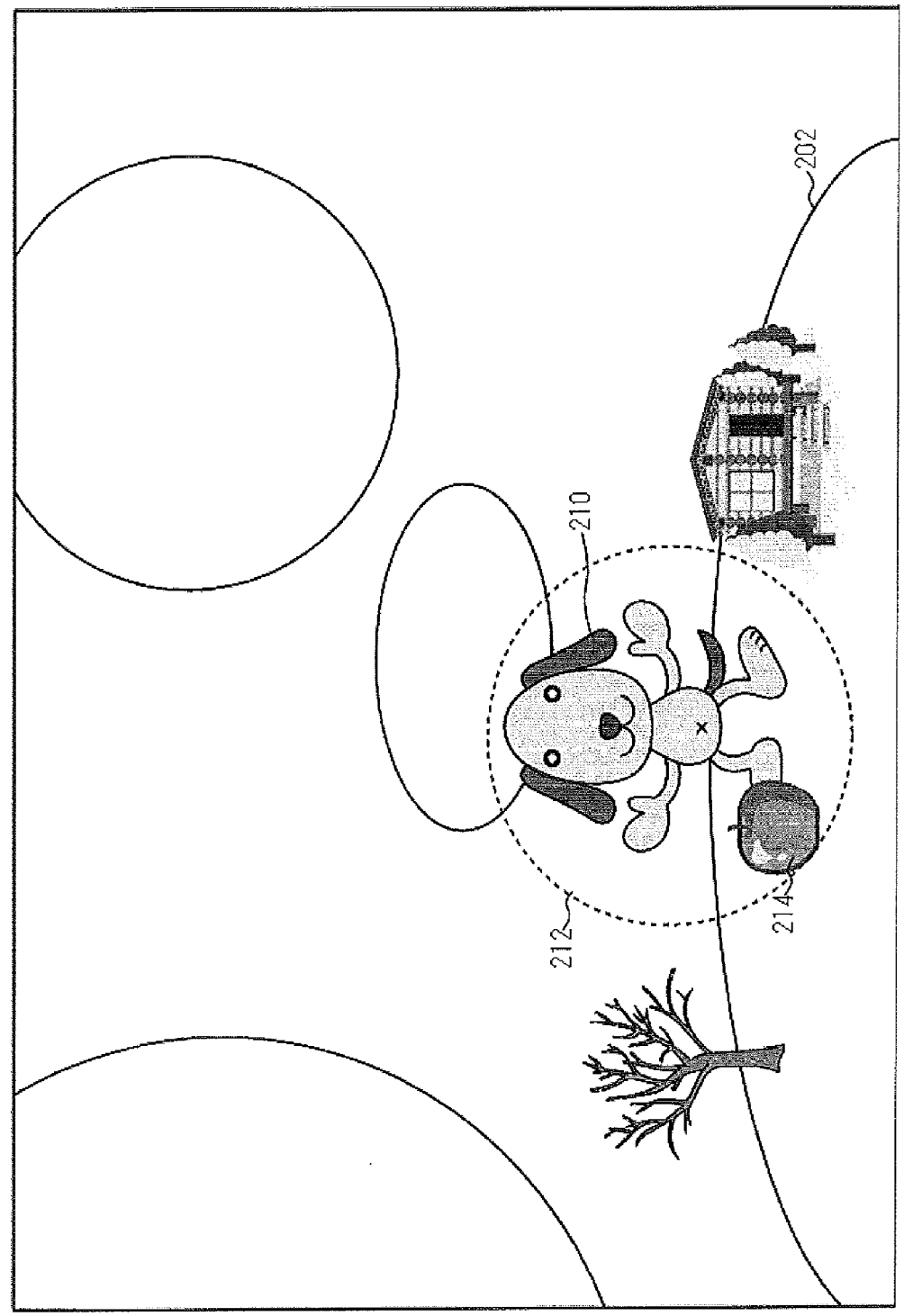
FIG. 9 shows an exemplary game screen.

FIG. 9 shows an exemplary screen. When the player uses the right button 26 of the input device 20, the gravitational direction control unit 43 moves the character 210 from the current position to a certain height, causing the character 210 to float in the air. In this process, an object 214 located within a predetermined range 212 around the character 210 is also caused to float in the air along with the character 210.

Figure 10:
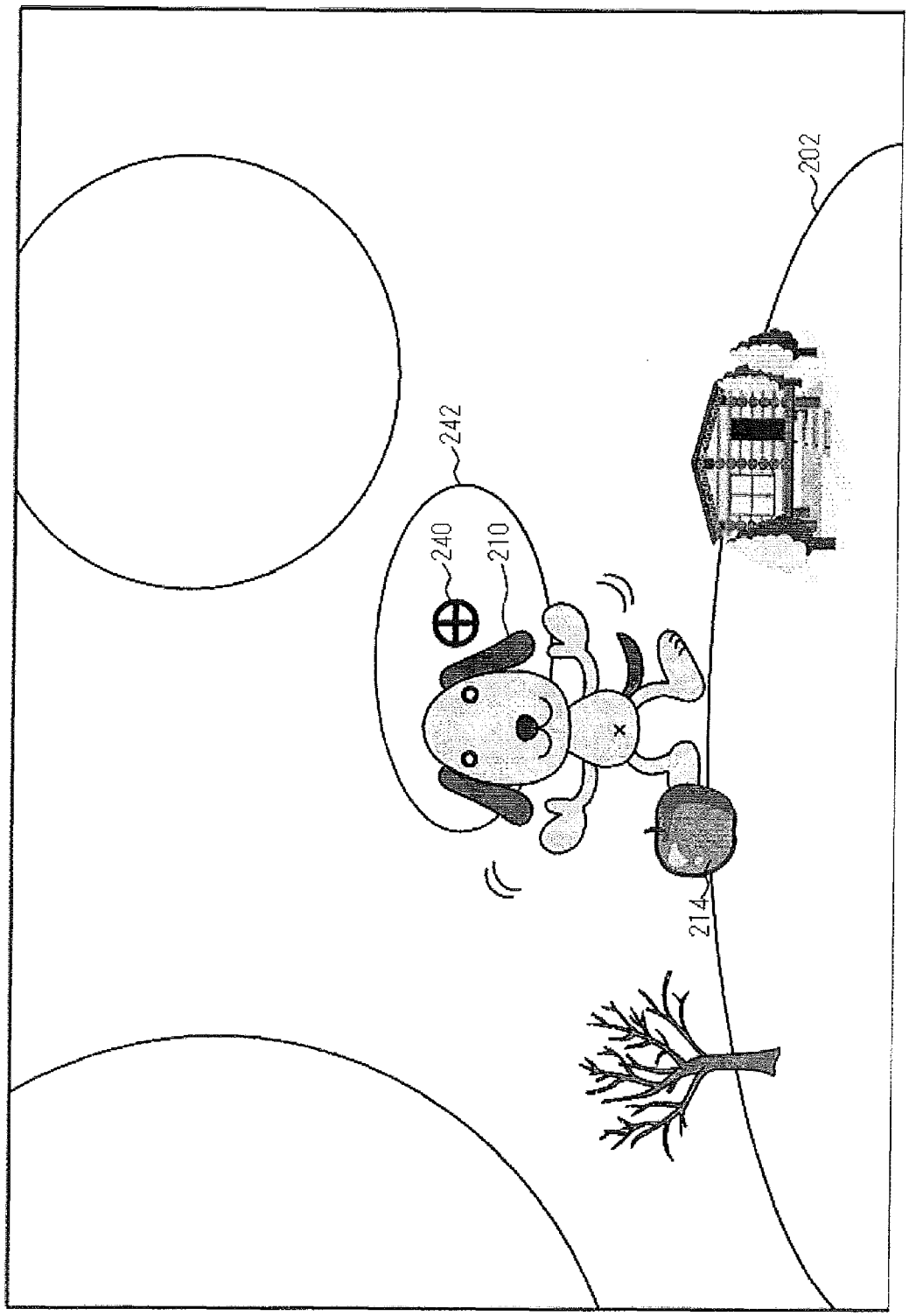
FIG. 10 shows an exemplary game screen.

FIG. 10 shows an exemplary game screen. FIG. 10 shows that the character 210 and the object 214 around the character 210 floating in the air. The gravitational direction control unit 43 displays a marker 240 indicating the position of landing of the character 210 when the gravitational direction is changed. This allows the player know that the character 210 can be caused to land on the object 242 by changing the gravitational direction. Since the gravitational direction control unit 43 changes the gravitational direction to be aligned with the direction of depth of the screen, the character 210 and the marker 240 should theoretically overlap each other substantially. If the character 210 and the marker 240 are displayed as such, the player will find it hard to see the marker 240. Therefore, the gravitational direction control unit 43 displays the character 210 and the object 214, displacing the character and the object from the marker so that the character 210 or the object 214 does not overlap the marker 240. For example, the gravitational direction control unit 43 may display the marker 240 substantially in the middle of the screen and display the character 210 and the object 214 displaced by a predetermined length in a predetermined direction. This allows the character 210 and the marker 240 to be viewed easily. While the character 210 is floating in the air, the character control unit 41 does not move the character 210. The camera control unit 42 changes the camera's viewing position in accordance with a command input. This allows the player to adjust direction of fall of the character 210 even while the character 210 is floating in the air. The character control unit 41 may change the orientation of the character 210 in the air in accordance with a command input.

Figure 11:
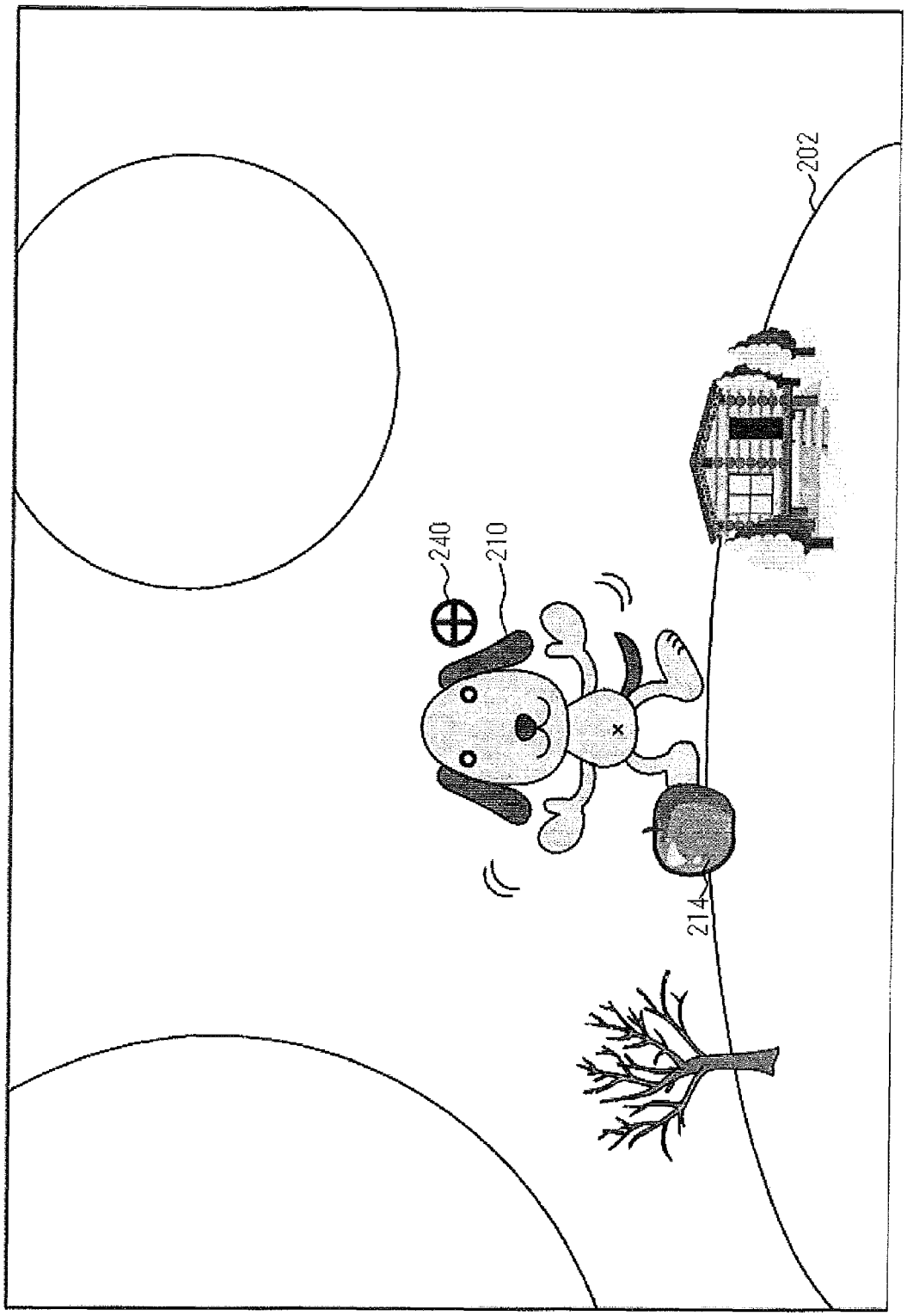
FIG. 11 shows an exemplary game screen.

FIG. 11 shows an exemplary screen. In the example shown in FIG. 11, no objects are found in the direction of fall of the character 210. Therefore, the gravitational direction control unit 43 displays a marker 240 at a predetermined distance in the direction of fall of the character 210.

When the player uses the right button 26 of the input device 20 again while the character 210 is floating in the air as shown in FIG. 10 or FIG. 11, the gravitational direction control unit 43 changes the gravitational direction to the camera's current viewing direction, i.e., the direction of depth of the screen. The fall control unit 44 exerts the gravitational force in the changed direction to be exerted on the character 210 and the object 214 around the character 210 so as to cause the character 210 and the object 214 to fall in that direction.

Figure 12:
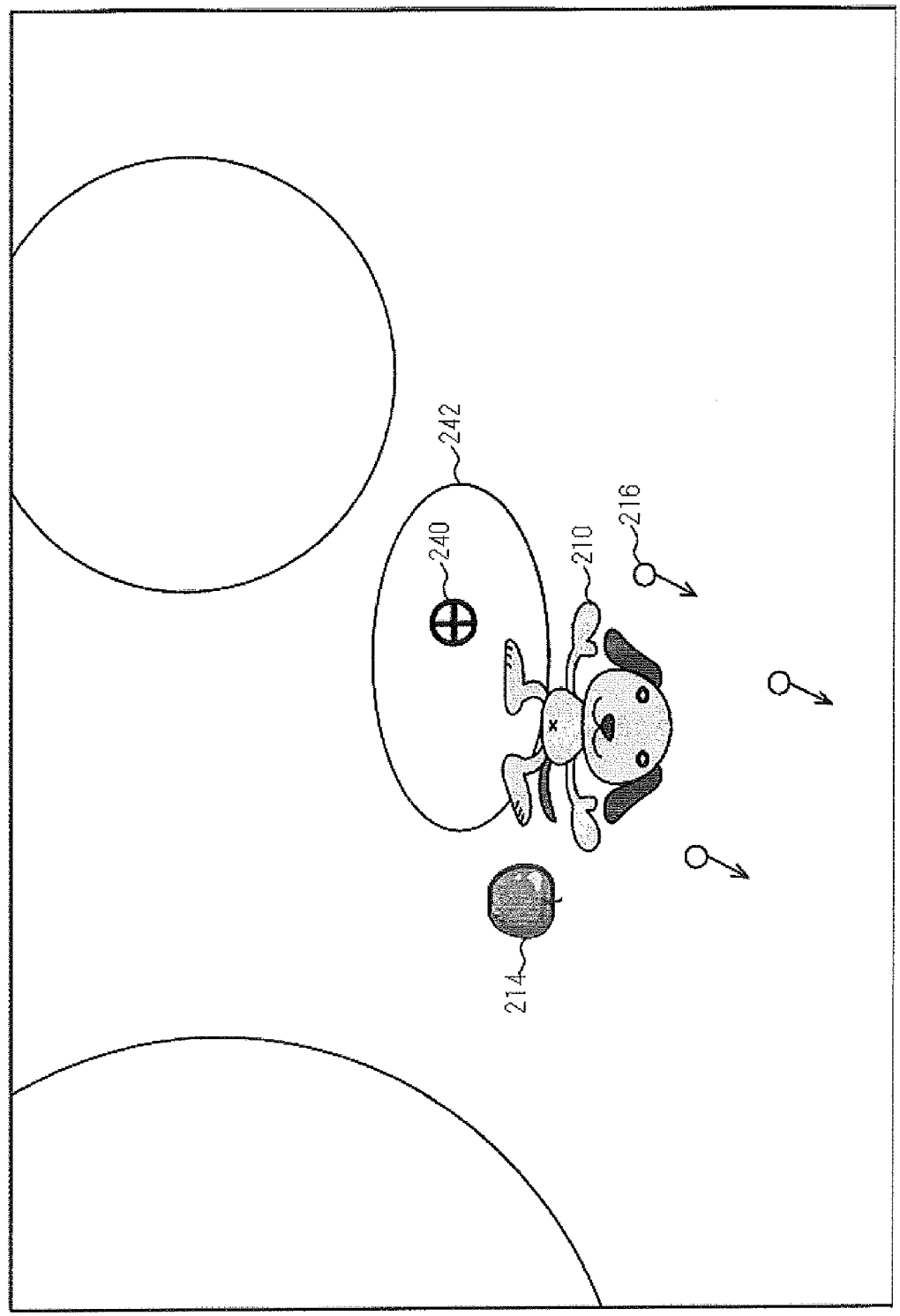
FIG. 12 shows an exemplary game screen.

FIG. 12 shows an exemplary game screen. While the character 210 is falling, the camera control unit 42 locates the camera's viewing position above the character 210, i.e., behind the character 210 in the direction of travel and define the direction of fall of the character 210 as the viewing direction. In this process, the fall control unit 44 changes the orientation of the character so that the character 210 falls feet first. The fall control unit 44 makes it easy to know the direction of fall of the character 210 by moving an object 216 located around the character 210 in the direction opposite to the direction of fall as viewed from the character 210. The fall control unit 44 may control the orientation of the character 210 so that the character 210 falls headlong. Alternatively, the fall control unit 44 may drive the articulation of the character in accordance with the falling speed, etc. and display the character 210 falling accordingly. Alternatively, an animation stored in the game data storage unit 62 and showing the character 210 falling may be read so as to show the character 210 falling. A plurality of animations may be combined and displayed.

Figure 13:
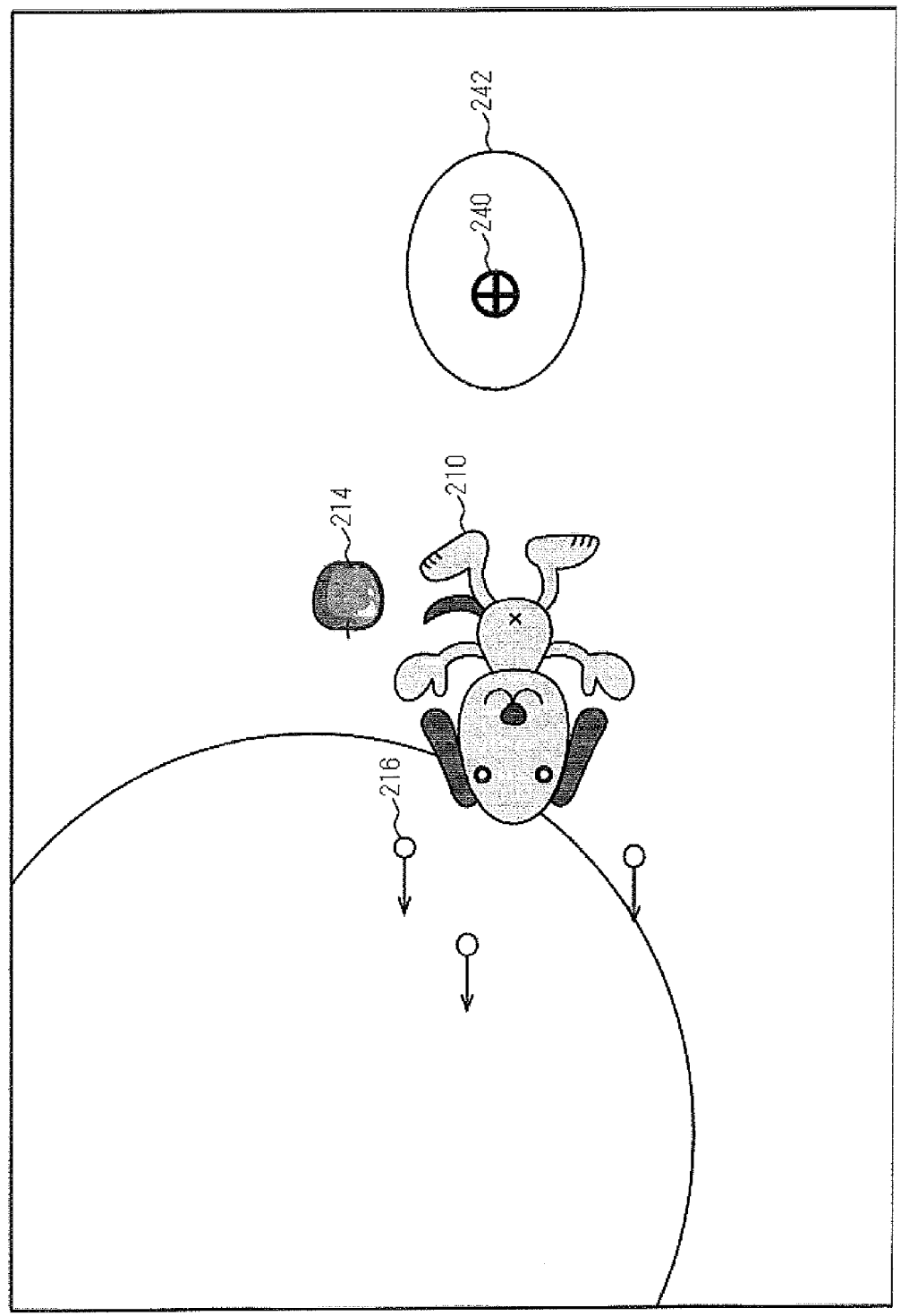
FIG. 13 shows an exemplary game screen.

FIG. 13 shows an exemplary game screen. When the player uses the right analog stick 24 of the input device 20 while the character 210 is falling, the camera control unit 42 moves the camera's viewing position in a designated direction. In this case, too, the fall control unit 44, moves the object 216 located around the character 210 in the direction opposite to the direction of fall as viewed from the character 210. The gravitational direction control unit 43 does not change the position of landing of the character 210 but changes the display position of the marker 240 on the screen in association with the change in the camera's viewing position.

Figure 14:
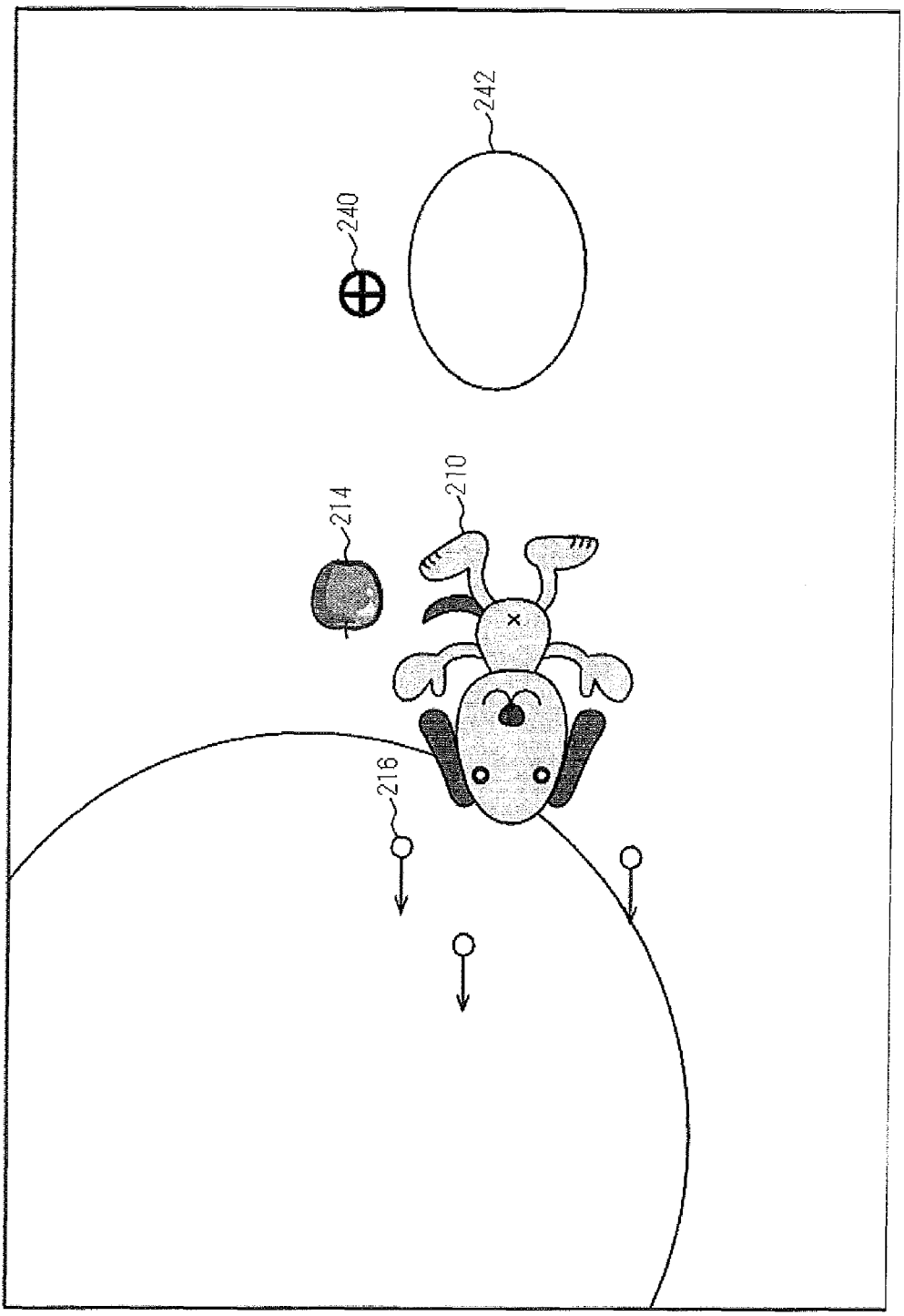
FIG. 14 shows an exemplary game screen.

FIG. 14 shows an exemplary game screen. When the player uses the left analog stick 23 of the input device 20 while the character 210 is falling, the gravitational direction control unit 43 moves the character 210 in the designated direction in the air. Since the position of landing of the character 210 is moved in association with the movement of the character 210, the marker 240 is also moved. This allows the player to change the position of landing of the character 210 even while the character 210 is falling.

Figure 15:
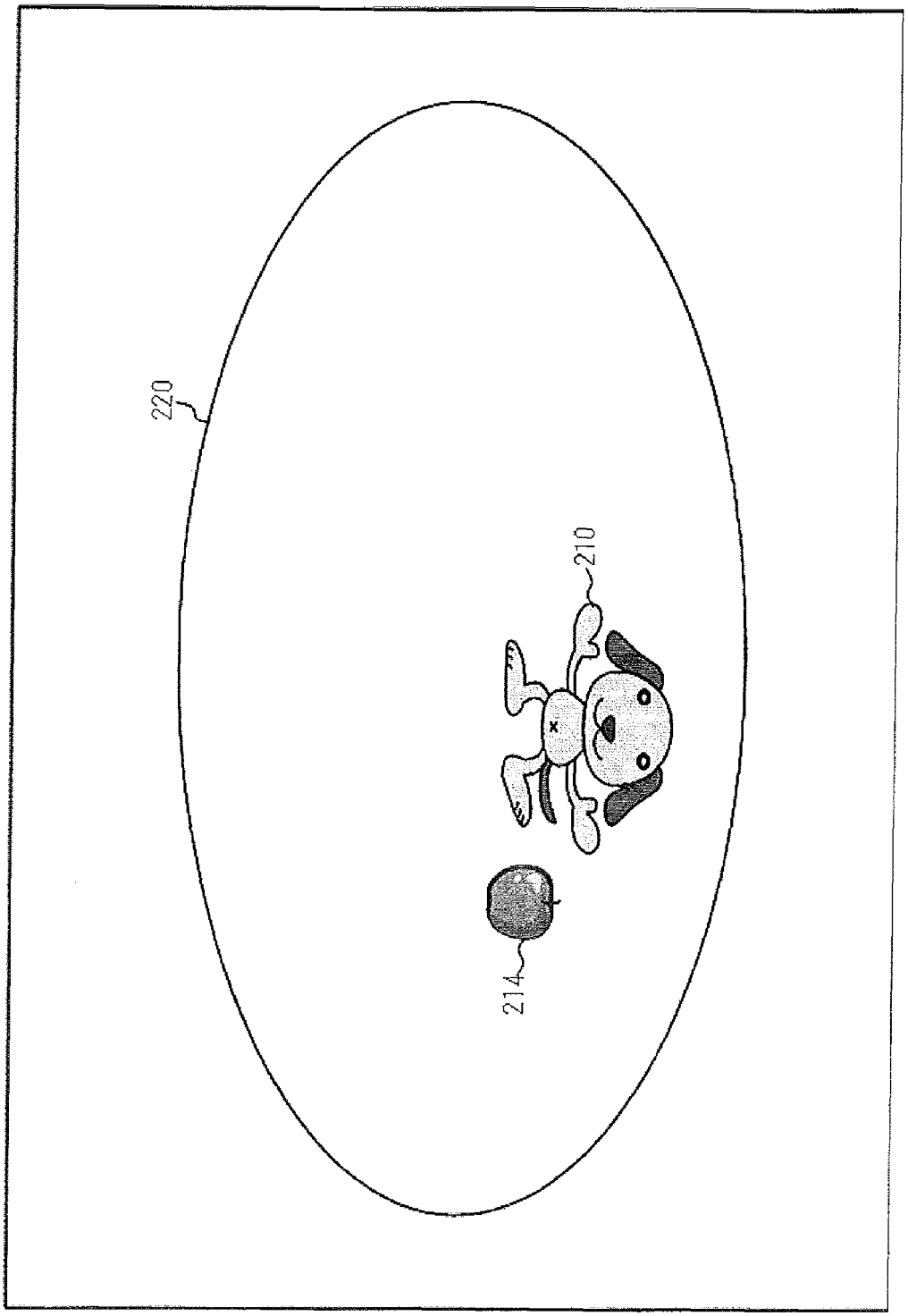
FIG. 15 shows an exemplary game screen.

FIG. 15 shows an exemplary game screen. When the character 210 runs into the object 220 located in the direction of fall, the fall control unit 44 causes the character 210 to land on the object 220. The fall control unit 44 moves the camera's viewing position to a predetermined position behind the character while displaying the landing character 210 rising to the character's feet, and rotates the screen so that the gravitational direction is aligned with the vertical direction of the screen. This allows the player to easily know the tilt of the ground that the character 210 landed as indicated in the game screen of FIG. 16.

Figure 16:
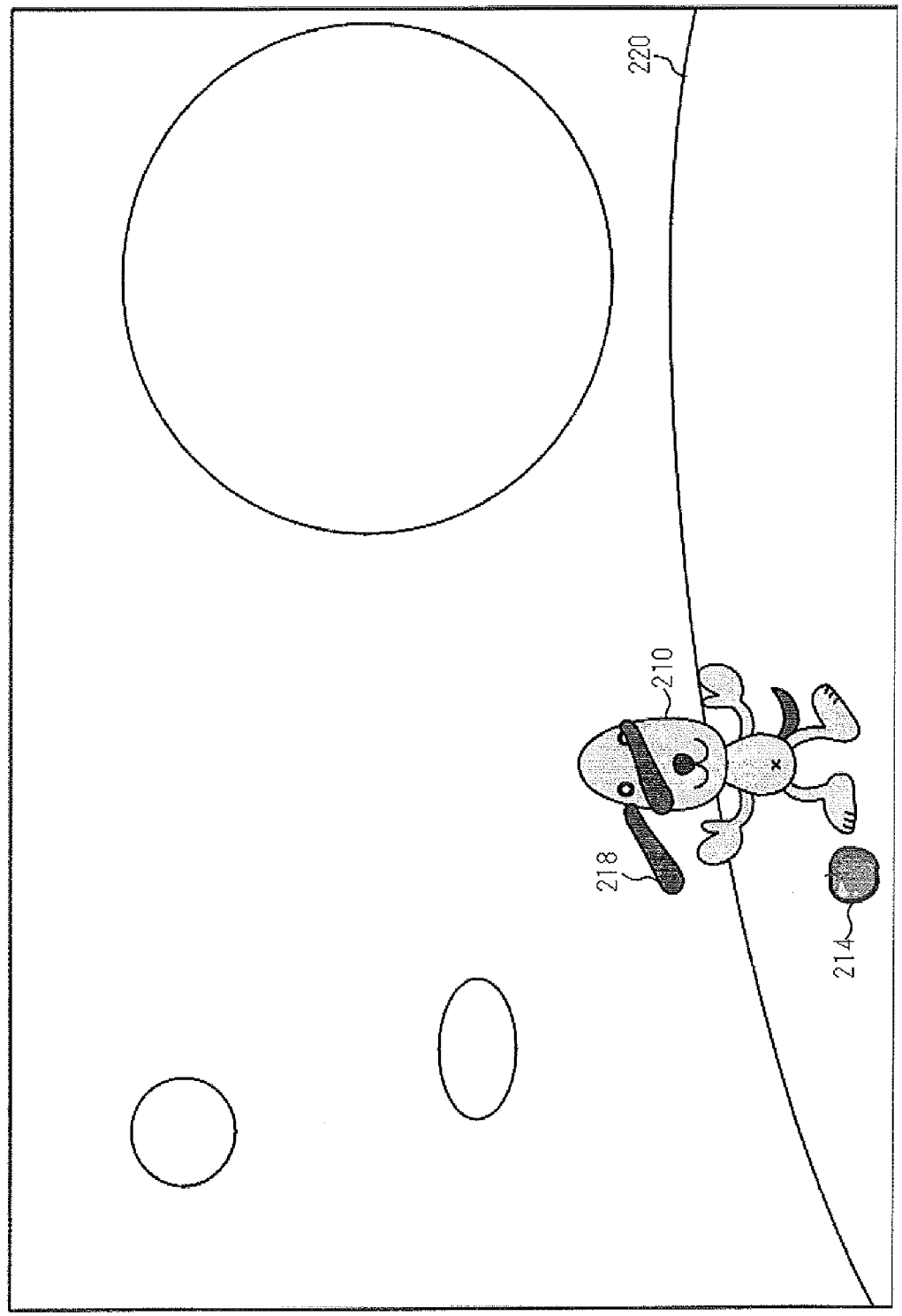
FIG. 16 shows an exemplary game screen.

FIG. 16 shows an exemplary game screen. While the gravitational direction is changed from the initial gravitational direction in the game field, the gravitational direction control unit 43 displays a part of the character 210 (e.g., an ear 218 or the hair) as being oriented in the initial gravitational direction. This allows the player to know that the current gravitational direction is changed from the default gravitational direction and know the relation between the default gravitational direction and the current gravitational direction.

Figure 17:
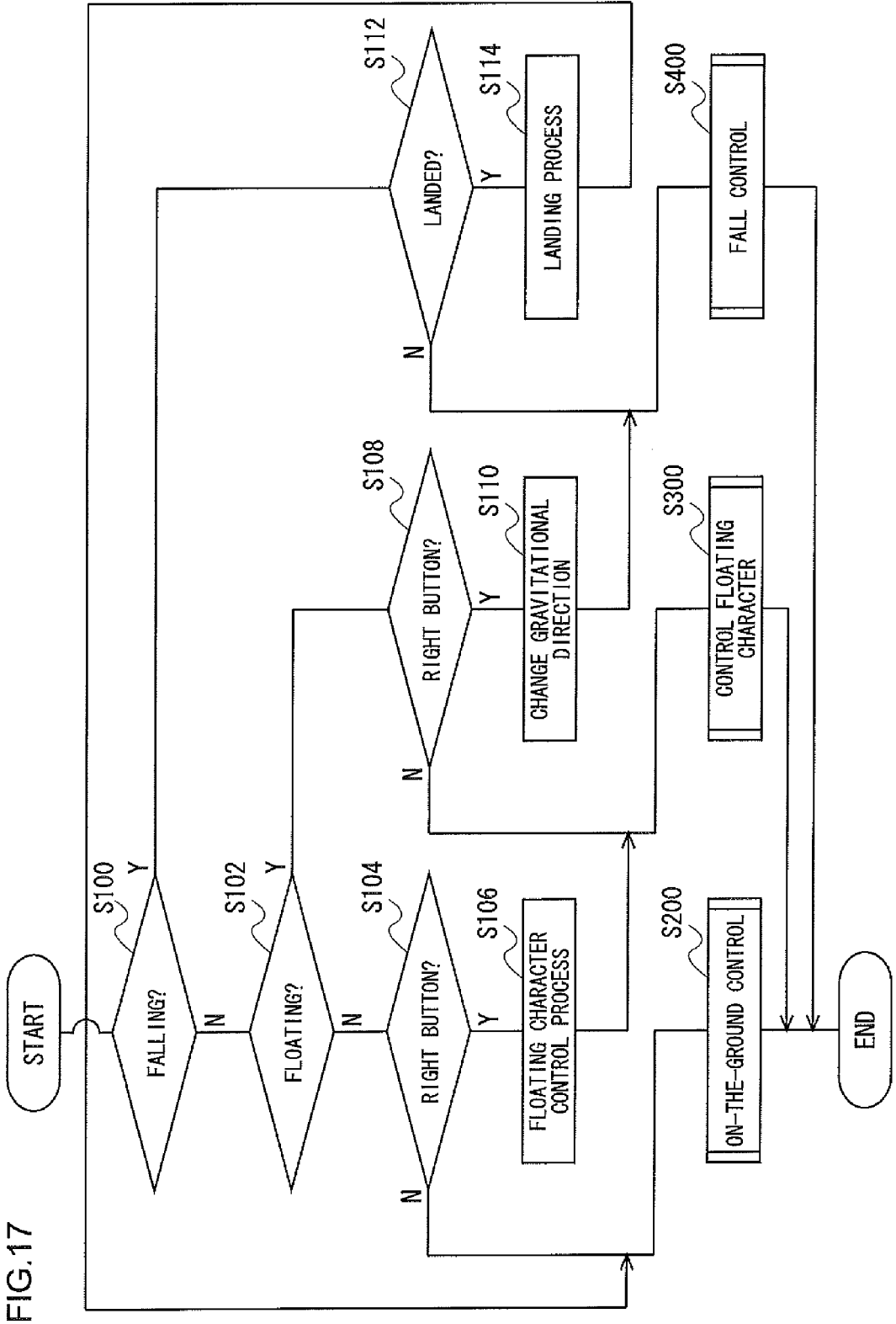
FIG. 17 is a flowchart showing the procedure for a game control method according to the embodiment.

FIG. 17 is a flowchart showing the procedure for a game control method according to the embodiment. When the character is not falling or floating (N in S100, N in S102), and when the right button 26 is not used (N in S104), the character control unit 41 controls the character on the ground (S200). When the right button 26 is used (Y in S104), the gravitational direction control unit 43 initiates a process of causing the character to float (S106) and subsequently controls the floating character (S300). While the character is floating (Y in S102), the gravitational control unit 43 controls the floating character (S300) until the right button 26 is used again (N in S108). When the right button 26 is used again (Y in S108), the gravitational direction control unit 43 changes the gravitational direction (S110) and subsequently controls the falling character (S400). While the character is falling (Y in S100), the fall control unit 44 controls the falling character (S400) until the character lands on an object, etc. (N in S112). When the character touches the ground of an object etc. (Y in S112), the fall control unit 44 initiates a process of causing the character to land on the object (S114). Subsequently, the character control unit 41 controls the character on the ground (S200). When the camera or the character is moved, the screen generation unit 66 generates a new screen and updates the display (not shown in FIG. 17). The above steps are repeated while the game is in progress.

Figure 18:
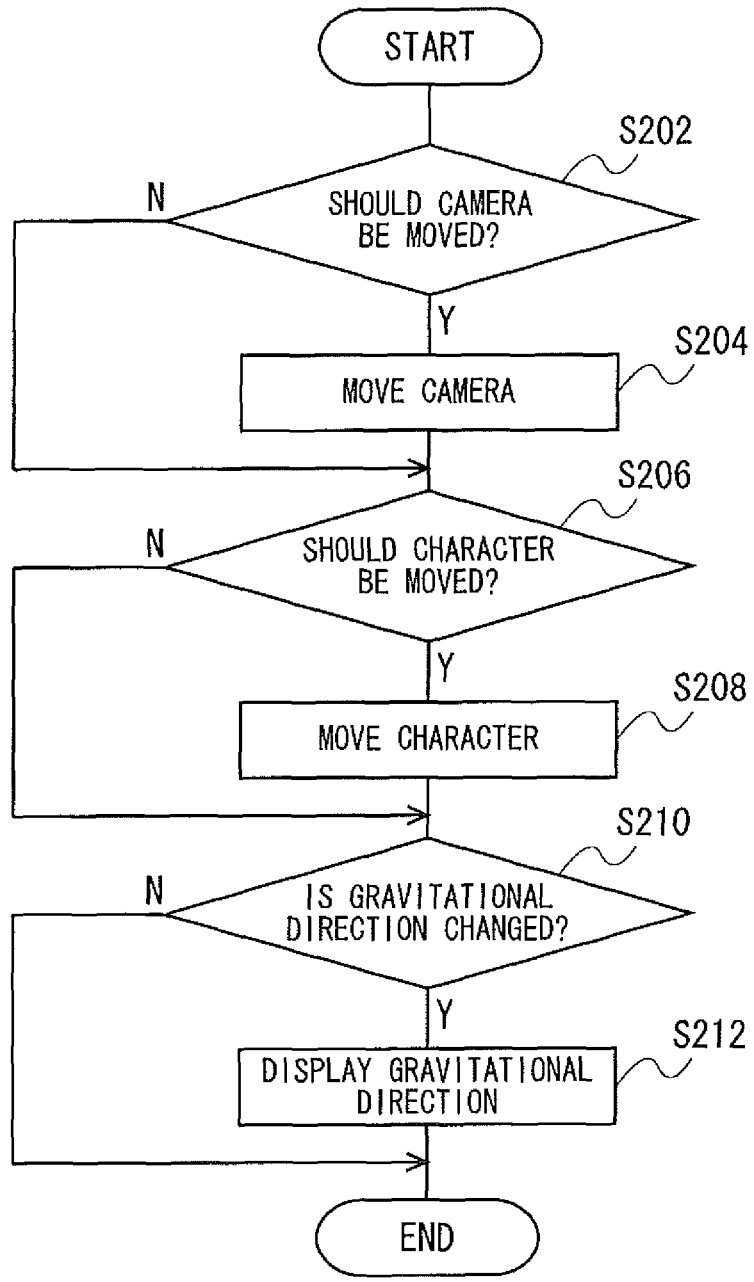
FIG. 18 is a flowchart showing the detail of the on-the-ground control procedure of FIG. 17.

FIG. 18 is a flowchart showing the detail of the on-the-ground control procedure of FIG. 17. When the player inputs a command to move the camera via the input device 20 (Y in S202), the camera control unit 42 moves the camera (S204). If a command is not input (N in S202), S204 is skipped. When the player inputs a command to move the character via the input device 20 (Y in S206), the character control unit 41 moves the character (S208). If a command is not input (N in S206), S208 is skipped. When the gravitational direction is changed from the initial gravitational direction (Y in S210), the gravitational direction control unit 43 displays the initial gravitational direction by, for example, orienting the hair, etc. of the character in the initial gravitational direction (S212). If the gravitational direction is not changed (N in S210), S212 is skipped.

Figure 19:
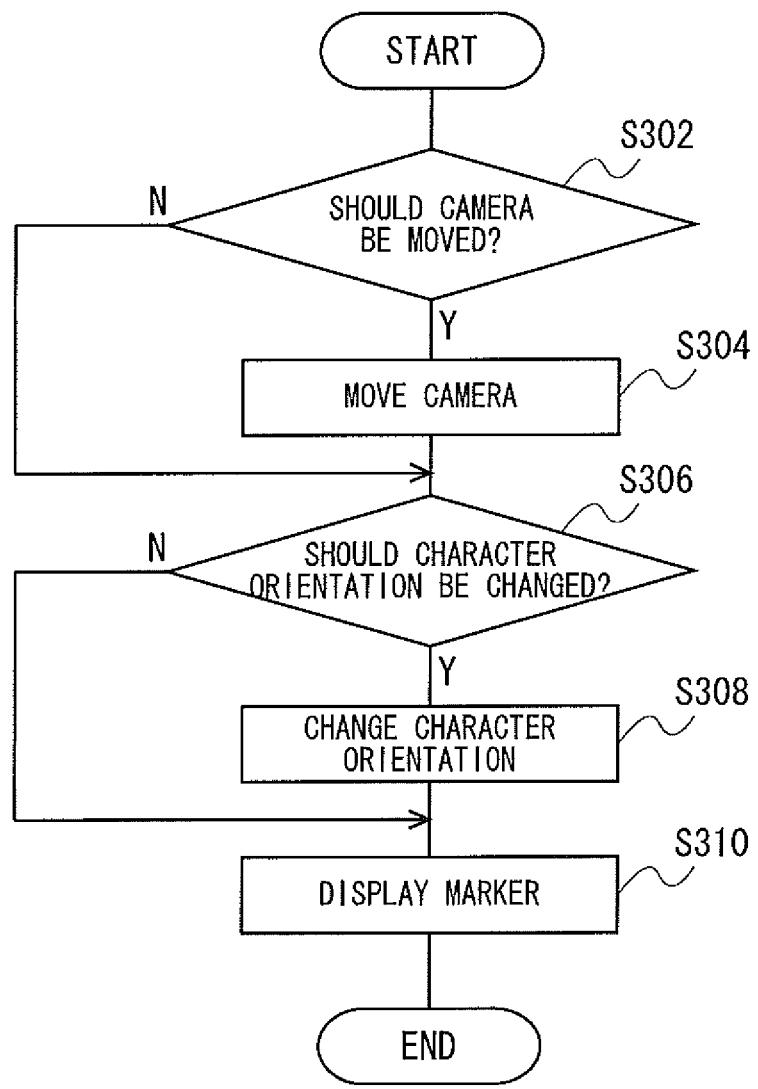
FIG. 19 is a flowchart showing the detail of the floating character control procedure of FIG. 17.

FIG. 19 is a flowchart showing the detail of the floating character control procedure of FIG. 17. When the player inputs a command to move the camera via the input device 20 (Y in S302), the camera control unit 42 moves the camera (S304). This allows adjusting of the gravitational direction as changed by the gravitation control unit 43 and adjusting of the direction of fall of the character. If a command is not input (N in S302), S304 is skipped. When the player inputs a command to change the character's orientation via the input device 20 (Y in S306), the character control unit 41 changes the orientation of the floating character (S308). If a command is not input (N in S306), S308 is skipped. The character control unit 41 does not move the character while the character is floating. The gravitational direction control unit 43 displays a marker indicating the expected position of landing of the character on the screen (S310).

Figure 20:
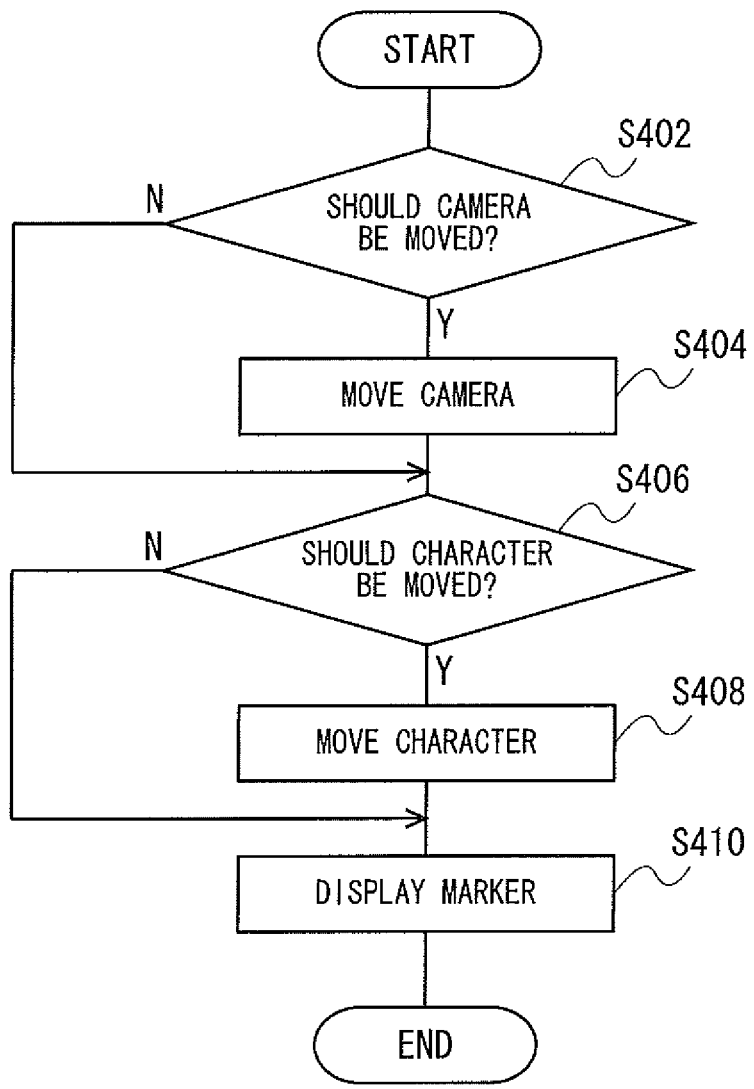
FIG. 20 is a flowchart showing the detail of the fall control procedure of FIG. 17.

FIG. 20 is a flowchart showing the detail of the fall control procedure of FIG. 17. When the player inputs a command to move the camera via the input device 20 (Y in S402), the camera control unit 42 moves the camera (S404). Unlike a case where the character is on the ground or the character is floating, the gravitational direction is not adjusted by moving the camera. If a command is not input (N in S402), S404 is skipped. When the player inputs a command to move the character via the input device 20 (Y in S406), the fall control unit 44 moves the falling character (S408). If a command is not input (N in S406), S408 is skipped. The gravitational direction control unit 43 displays a marker indicating the expected position of landing of the character on the screen (S410).

Thus, the game device according to the embodiment not only causes the character to fall but also causes an object located in the neighborhood of the character to fall along with the character in a gravitational direction as changed. Therefore, the inventive method of moving may be used to transport an object to a predetermined destination. The gravitational force as changed is exerted only on the character and the object around the character and the other objects are not moved. Therefore, a novel game feature is provided whereby the gravitational direction is changed in a way that the computational load is prevented from being seriously increased.

Described above is an explanation based on an exemplary embodiment. The embodiment is intended to be illustrative only and it will be obvious to those skilled in the art that various modifications to constituting elements and processes could be developed and that such modifications are also within the scope of the present invention.

In the embodiment, the gravitational direction is described as being changed to be aligned with the camera's viewing direction when an input is provided via the right button 26 of the input device 20. In a variation, the gravitational direction may be changed such that a wall located in the neighborhood of the character represents the bottom. Still alternatively, a touch input via the touch panel to designate the bottom may be acknowledged or a flick input may be acknowledged so that the gravitational direction is changed accordingly.

What is claimed is:

1. A non-transitory computer readable recording medium having stored therein a game control program capable of causing a processing system or device to exhibit functional modules, comprising:

a module configured to read data for a character and an object located in a three-dimensional game field from a storage device, to generate images of the character and the object, and to display the images on a display device;

a module configured to control a movement of the character landing on an object;

a module configured to change a direction of gravitational force exerted on the character in accordance with a command input from a player acknowledged by an input device;

a module configured to cause the character to fall in the changed direction of the gravitational force; and a module configured to display a marker indicating a position where the character would land after falling.

2. The non-transitory computer readable recording medium according to claim 1, wherein, if an object is located within a range defined by a predetermined distance in the direction that the character falls, the module to display the marker displays the marker at the position of the closest object, and, if there are no objects in the direction of the fall, the module to display the marker displays the marker at a position defined by the predetermined distance.

3. The non-transitory computer readable recording medium according to claim 1, further comprising:

a module configured to change a viewing position or viewing direction used when generating the image, in accordance with a command input from the player acknowledged by the input device, wherein the module to change the gravitational direction changes the gravitational direction to a direction that is parallel to the viewing direction occurring when a command input for changing the gravitational direction is acknowledged.

4. The non-transitory computer readable recording medium according to claim 3, wherein the module configured to change the gravitational direction causes the character to float to a predetermined height in accordance with a command input from the player acknowledged by the input device, and to change the direction of gravitational force exerted on the character in accordance with a further command input from the player acknowledged by the input device.

5. The non-transitory computer readable recording medium according to claim 4, wherein the module configured to control the movement of the character does not move the character while the character is floating in the air.

6. The non-transitory computer readable recording medium according to claim 4, wherein the module configured to change the viewing position or viewing direction changes the viewing position or viewing direction in accordance with a command input from the player acknowledged by the input device even while the character is floating in the air, and the module configured to display the marker changes the position of the marker in accordance with a change in the viewing position or viewing direction.

7. The non-transitory computer readable recording medium according to one of claim 1, wherein the module configured to display a marker displays the character, displacing the character from the marker so that the character does not overlap with the marker, in the case where the character and the marker would otherwise overlap each other.

8. A game device comprising:

a screen generation device configured to read data for a character and an object located in a three-dimensional game field from a storage device, to generate images of the character and the object, and to display the images on a displace device;

a character control device configured to control a movement of the character landing on the object;

a gravitational direction control device configured to change a direction of gravitational force exerted on the character in accordance with a command input from a player acknowledged by an input device; and a fall control device configured to cause the character to fall in the changed direction of the gravitational force, wherein the gravitational direction control unit displays a marker indicating a position where the character would land after falling.

9. A game control method comprising:

reading, using an image generation device, data for a character and an object located in a three-dimensional game field from a storage device, generating images of the character and the object, and displaying the images on a displace device;

controlling, using a character control device, a movement of the character landing on the object;

changing, using the gravitational direction control device, a direction of gravitational force exerted on the character in accordance with a command input from a player acknowledged by an input device; and causing, using a fall control device, the character to fall in the changed direction of the gravitational force, wherein the gravitational direction control device displays a marker indicating a position where the character would land after falling.

10. A non-transitory computer readable recording medium having stored therein a game control program capable of causing a processing system or device to exhibit functional modules, comprising:

a module configured to read data for a character and a plurality of objects from a storage device and to generate images of the character and the plurality of objects located in a three-dimensional game field, and to display the images on a display device;

a module configured to control a movement of the character landing on an object;

a module configured to change a direction of gravitational force exerted on the character in accordance with a command input from a player;

a module configured to cause the character to fall in the changed direction of the gravitational force; and a module configured to cause an object within a predetermined range from the character to fall in the changed direction of the gravitational force along with the character.

11. The non-transitory computer readable recording medium according to claim 10, further comprising:

a module configured to change a viewing position or viewing direction used when generating the image, wherein the module configured to change the gravitational direction changes the gravitational direction to a direction that is parallel to the viewing direction occurring when the command input is acknowledged.

12. The non-transitory computer readable recording medium according to claim 11, wherein the module configured to change the viewing position or viewing direction changes the viewing position in accordance with a command input from the player and defines the viewing direction for viewing the character from the viewing position.

13. The non-transitory computer readable recording medium according to claim 10, wherein the module configured to cause the character to fall controls a part of the character while the character is falling to be oriented in a direction of fall or in a direction opposite to the direction of fall.

14. The non-transitory computer readable recording medium according to claim 10, wherein the module configured to cause the character to fall controls, while the gravitational direction is being changed, a part of the character to be oriented in the gravitational direction occurring before the direction is changed by the module configured to change the gravitational direction.

15. The non-transitory computer readable recording medium according to claim 10, further comprising: a module configured to change the viewing position used when generating the image to a predetermined position after the falling character lands on an object located in the game field, and rotates the image so that the current gravitational direction is aligned with the vertical direction of the image.

16. A game device, comprising:

a screen generation device configured to generate images of a character and a plurality of objects located in a three-dimensional game field and to display the images;

a character control device configured to control a movement of the character landing on the object;

a gravitational direction control device configured to change a direction of gravitational force exerted on the character in accordance with a command input from a player; and a fall control device configured to cause the character to fall in the changed direction of the gravitational force and cause an object within a predetermined range from the character to fall in the changed direction of the gravitational force along with the character.

17. A game control method comprising:

reading data for a character and a plurality of objects from a storage device;

generating images of the character and the plurality of objects located in a three-dimensional game field and displaying the images on a display device;

controlling a movement of the character landing on an object;

changing a direction of gravitational force exerted on the character in accordance with a command input from a player;

causing the character to fall in the changed direction of the gravitational force; and causing an object within a predetermined range from the character to fall in the changed direction of the gravitational force along with the character.

* * * * *